United States Patent [19]

Müller

[11] Patent Number: 5,007,237
[45] Date of Patent: Apr. 16, 1991

[54] DIESEL INTERNAL COMBUSTION ENGINE WITH TEMPERATURE-DEPENDENT ADJUSTMENT OF START OF FUEL INJECTION

[75] Inventor: Eckart Müller, Gifhorn, Fed. Rep. of Germany

[73] Assignee: Volkswagen A.G., Wolfsburg, Fed. Rep. of Germany

[21] Appl. No.: 386,283

[22] Filed: Jul. 27, 1989

[30] Foreign Application Priority Data

Aug. 23, 1988 [DE] Fed. Rep. of Germany ....... 3828540

[51] Int. Cl.$^5$ .................... F01N 3/00; F02N 17/00
[52] U.S. Cl. .................. 60/285; 123/179 L; 123/501
[58] Field of Search ............ 60/299, 300, 285; 123/500, 501, 179 L

[56] References Cited

U.S. PATENT DOCUMENTS

| | | | |
|---|---|---|---|
| 4,211,075 | 7/1980 | Ludecke | 60/285 |
| 4,251,989 | 2/1981 | Norimatsu | 60/285 |
| 4,274,381 | 6/1981 | Abo | 60/285 |
| 4,322,947 | 4/1982 | Wossner | 60/285 |
| 4,452,040 | 6/1984 | Kobashi | 60/285 |
| 4,617,793 | 10/1986 | Suzuki | 60/285 |
| 4,617,794 | 10/1986 | Fujitani | 60/285 |
| 4,685,290 | 8/1987 | Kamiya | 60/285 |
| 4,715,179 | 12/1987 | Muller | 60/285 |
| 4,753,211 | 6/1988 | Hofer | 123/179 L |
| 4,765,301 | 8/1988 | Koike | 123/179 L |

Primary Examiner—Carl Stuart Miller
Attorney, Agent, or Firm—Brumbaugh, Graves, Donohue & Raymond

[57] ABSTRACT

In order to reduce both a $NO_x$ component and a hydrocarbon component of exhaust gases of a diesel internal combustion engine, the fuel injection start-up is delayed in the presence of a catalyst for oxidation of the hydrocarbons. The catalyst is in the exhaust gas line of the engine, and an adjacent temperature sensor coordinates the injection start-up delay with a start-up temperature of the catalyst.

3 Claims, 1 Drawing Sheet

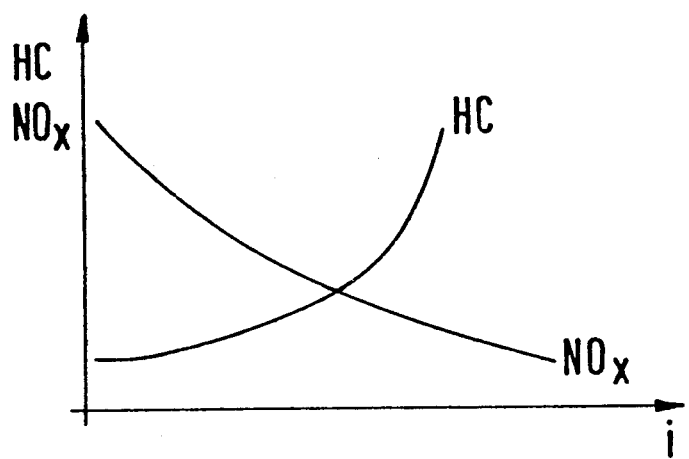
Fig.1
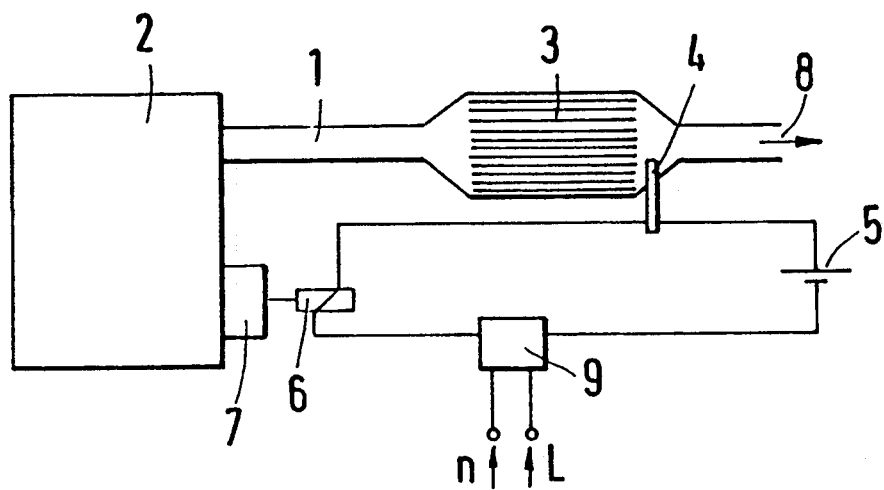
Fig.2
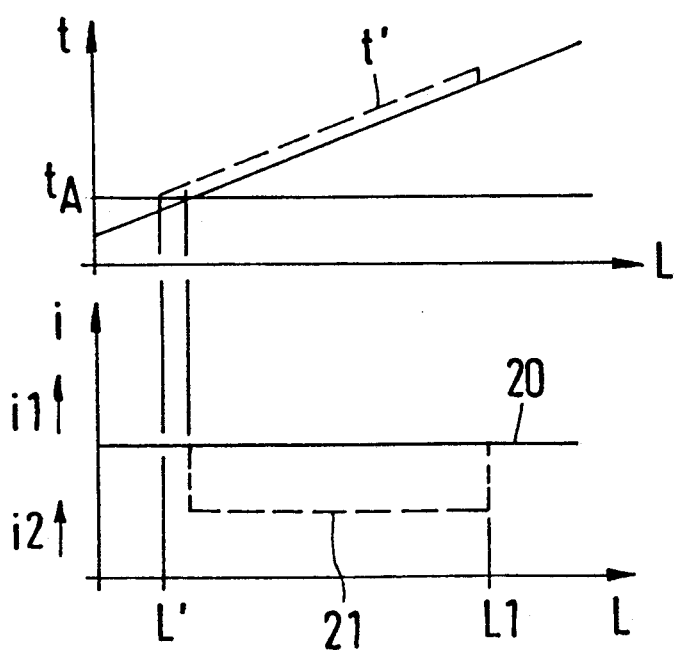
Fig.3
Fig.4

DIESEL INTERNAL COMBUSTION ENGINE WITH TEMPERATURE-DEPENDENT ADJUSTMENT OF START OF FUEL INJECTION

BACKGROUND OF THE INVENTION

This invention concerns diesel internal combustion engines and, more particularly, such engines with a device for temperature-dependent adjustment of fuel injection start-up.

As German Offenlegungsschrift No. 26 53 046 reveals, pollutant emission from a diesel engine can be favorably influenced by appropriate adjustment to starting fuel injection. A device disclosed therein utilizes performance characteristics of the diesel engine, including rpms, load, and an engine temperature, to control the start of the injection.

Another prior art reference is EP 0 137 316 A1 which describes how to adjust the start of fuel injection in a direction of earlier injection for cold diesel engines and during hot-running of such engines. A thermostat determines the temperature.

However, it has not been possible heretofore to reduce both a hydrocarbon component and a $NO_x$ component in the pollutant emission from a diesel engine to low amounts. While the $NO_x$ content diminishes by delaying the start of injection, the hydrocarbon content increases. Unless other values of individual engine parameters require a different adjustment, an injection starting time, with due consideration for fuel consumption, usually falls in an area in which both the hydrocarbon and the $NO_x$ components represent moderate amounts in a waste gas. Decreasing the $NO_x$ content by delaying the start of injection is thus limited by a steep increase in the hydrocarbon emission.

SUMMARY OF THE INVENTION

Accordingly, an object of the invention is to provide a diesel internal combustion engine arranged so that both the hydrocarbon and the $NO_x$ components of the waste gas are reduced to low amounts.

Another object of the invention is to provide a diesel internal combustion engine having an adjustment or control of injection start-up dependent on a temperature of the waste gas such that only when the temperature exceeds a start-up temperature of a catalyst is injection start-up postponed to a time of very low $NO_x$ content in the waste gas.

These and other objects of the invention are attained by providing a diesel internal combustion engine having a catalyst for oxidation of hydrocarbons in the exhaust gas in an exhaust gas line and a device which delays injection start-up only when a temperature sensor near the catalyst detects temperatures exceeding the start-up temperature of the catalyst.

BRIEF DESCRIPTION OF THE DRAWINGS

Further objects and advantages of the invention will be apparent from a reading of the following description of a preferred embodiment in conjunction with the accompanying drawings in which:

FIG. 1 is a graphical representation showing a dependence of hydrocarbon and $NO_x$ emissions in exhaust gas on injection start-up, with the abscissa arrow indicating delay;

FIG. 2 is a schematic block diagram illustrating a representative embodiment of the invention;

FIG. 3 is a graphical representation illustrating the relation between exhaust gas temperature and engine load; and FIG. 4 is a graphical representation showing in schematic form an adjustment of injection start-up depending on the exhaust gas temperature and depending on the engine load.

DESCRIPTION OF PREFERRED EMBODIMENT

As illustrated in FIG. 1, the $NO_x$ content of the exhaust gas decreases considerably by delaying the fuel injection start-up i, which represents increasing delay in the direction of the abscissa arrow. However, this desirable decrease comes at the expense of a considerable increase in the hydrocarbon, HC, content, as illustrated in FIG. 1.

In the typical embodiment of the invention shown in FIG. 2, the invention overcomes the dilemma illustrated in FIG. 1. A catalyst 3, which oxidizes incompletely burned or completely unburned hydrocarbons in the exhaust gas, is disposed in the exhaust gas line 1 of a diesel internal combustion engine 2 so that few hydrocarbons are present in the exhaust gas leaving the exhaust gas line, represented by the arrow 8. The exhaust gas line 1 and the diesel internal combustion engine 2 are constructed in the customary manner and therefore will not be described in detail. The catalyst 3 also functions in a known manner and operates only when its temperature exceeds a start-up temperature $t_A$. This start-up temperature is around 200° C.

Referring to FIG. 1 and to FIG. 2, if the fuel injection start-up i has been delayed to provide a low $NO_x$ content at a temperature below the start-up temperature $t_A$ of the catalyst 3, a high HC content will be present in the exhaust gas 8. To avoid this dilemma, the catalyst 3 is provided with an adjacent thermo-circuit 4, which is in a circuit between a voltage source 5 and an activation solenoid 6 for an injection timing mechanism 7 of the diesel engine 2. The thermo-circuit 4 closes the circuit only when it detects a catalyst or exhaust gas temperature that exceeds the start-up temperature of the catalyst 3. Once the thermocircuit 4 closes the circuit, the activation solenoid 6, for example, an electrovalve, activates the injection timing mechanism 7 to delay the injection start-up i. This arrangement ensures that the exhaust gases 8 leaving the exhaust gas line 1 have low $NO_x$ and HC contents concurrently.

In the circuit described, a control device 9 is included between the voltage source 5 and activation solenoid 6 to determine a lag rate for the injection start-up i depending on the rpms n and the load L of the internal combustion engine 2. The rpms n and the load L are characteristic performance parameters of the engine 2. The injection start-up i can be adjusted continuously or in stages.

FIG. 3 shows that the exhaust gas temperature t rises with increasing load L. In FIG. 3, the start-up temperature of the catalyst 3 of FIG. 2 is represented by a horizontal line labeled $t_A$.

In FIG. 4, injection start-up i is indicated versus the load L, with an arrow i1 representing speed-up adjustments for injection time and with an arrow i2 symbolizing lag adjustments for injection time. The horizontal line 20 indicates a conventional continuous adjustment of the injection start-up. According to the embodiment of the invention, the injection start-up i begins to be lagged, as indicated by arrow i2, as soon as the exhaust gas temperature t has reached the start-up temperature $t_4$ of catalyst 3 in FIG. 2. This adjustment results in a relation represented by a curved line which approaches a horizontal line 21. However, the adjustment of the injection start-up is reversed to the direction indicated by i1 as soon as the load of the engine reaches a value L1. At L1, other factors such as loss of output and excessively high exhaust gas temperature outweigh any benefit from further decreases in the $NO_x$ content of the exhaust gas. Thus, additional delay of the injection start-up is not justifiable when the engine load reaches the value L1.

As indicated by a dashed line labeled t' in FIG. 3, the lagging of injection time i as symbolized by arrow i2 in FIG. 4 results in an increase in the exhaust gas temperature t. Consequently, the catalyst 3 in FIG. 2 can reach its start-up temperature $t_4$ for a lower engine load L' and therefore can operate over an expanded range of lower engine loads.

The invention thus provides a diesel internal combustion engine that provides for a decrease of the $NO_x$ component without a corresponding increase of the HC component in the exhaust gases. This and other objects of the invention are attained by an inexpensive and simple measure. Delaying fuel injection start-up also provides quieter engine operation and a wider effective range for the catalyst with respect to operating characteristics of the engine because of the exhaust gas temperature increase.

Although the invention has been described herein with reference to a specific embodiment, many modifications and variations of the invention will readily occur to those skilled in the art. Accordingly, all such variations and modifications are included within the intended scope of the invention.

I claim:

1. A diesel internal combustion engine having an arrangement for temperature-dependent adjustment of fuel injection start-up comprising catalyst means which is effective only for promoting oxidation of hydrocarbons in exhaust gas in an exhaust gas line of the engine at a temperature exceeding a start-up temperature, temperature sensor means for detecting the temperature of the catalyst means, and a control means for delaying fuel injection start-up only when the temperature sensor means detects a temperature that exceeds the start-up temperature of the catalyst means.

2. A diesel internal combustion engine according to claim 1 in which the control means includes a circuit containing the temperature sensor means and activation magnet means for actuating an injection timing mechanism according to the temperature detected by the temperature sensor means and the start-up temperature of the catalyst means.

3. A diesel internal combustion engine according to claim 1 or 2 in which the control means controls the fuel injection start-up delay depending on at least one engine performance parameter.

* * * * *